(12) United States Patent
Singh et al.

(10) Patent No.: US 10,701,520 B2
(45) Date of Patent: Jun. 30, 2020

(54) SMART COMMISSIONING FOR FIRST RESPONDERS IN INCIDENT COMMAND SYSTEM

(71) Applicant: SCOTT TECHNOLOGIES, INC.', Monroe, NC (US)

(72) Inventors: Sarabjit Singh, Jharkhand (IN); Mukul Jain, Karnataka (IN); Michael Evans, Charlotte, NC (US)

(73) Assignee: Scott Technologies, Inc., Monroe, NC (US)

( * ) Notice: Subject to any disclaimer, the term of this patent is extended or adjusted under 35 U.S.C. 154(b) by 0 days.

(21) Appl. No.: 16/325,822

(22) PCT Filed: Aug. 16, 2017

(86) PCT No.: PCT/US2017/047147
§ 371 (c)(1),
(2) Date: Feb. 15, 2019

(87) PCT Pub. No.: WO2018/035225
PCT Pub. Date: Feb. 22, 2018

(65) Prior Publication Data
US 2019/0191278 A1   Jun. 20, 2019

Related U.S. Application Data

(60) Provisional application No. 62/376,040, filed on Aug. 17, 2016.

(51) Int. Cl.
*H04W 4/029* (2018.01)
*G06Q 50/26* (2012.01)
*G06Q 10/06* (2012.01)
*G07C 9/27* (2020.01)
*G07C 9/28* (2020.01)
*G06K 7/10* (2006.01)
*G06K 19/06* (2006.01)
(Continued)

(52) U.S. Cl.
CPC ........ *H04W 4/029* (2018.02); *G06K 7/10475* (2013.01); *G06K 19/06028* (2013.01); *G06K 19/0723* (2013.01); *G06Q 10/06* (2013.01); *G06Q 50/26* (2013.01); *G07C 9/27* (2020.01); *G07C 9/28* (2020.01); *G08B 25/016* (2013.01);
(Continued)

(58) Field of Classification Search
CPC combination set(s) only.
See application file for complete search history.

(56) References Cited

U.S. PATENT DOCUMENTS

| 5,596,652 A | 1/1997 | Piatek |
| 5,793,882 A | 8/1998 | Piatek |

(Continued)

OTHER PUBLICATIONS

International Search report for PCT International Application No. PCT/US2017/047147 dated Oct. 24, 2017, 5 pages.

*Primary Examiner* — Travis R Hunnings

(57) ABSTRACT

A system for commissioning for first responders at a site of an incident is provided. The system includes a data processing device configured to: receive personnel data; generate a unique personnel profile based on the personnel data; communicating the unique personnel profile to a tag creation device for creation of a tag corresponding to the unique personnel profile; receive scanning location information of the tag, and cause display, at a monitoring display, of alert data associated with the scanning location information. The alert data is a result of applying at least one user-defined rule to the scanning locating information.

20 Claims, 4 Drawing Sheets

(51) Int. Cl.
*G06K 19/07* (2006.01)
*G08B 25/01* (2006.01)
*G08B 27/00* (2006.01)
*H04L 29/08* (2006.01)
*H04W 4/021* (2018.01)

(52) U.S. Cl.
CPC .......... *G08B 27/001* (2013.01); *H04L 67/306* (2013.01); *H04W 4/021* (2013.01)

(56) References Cited

U.S. PATENT DOCUMENTS

| | | |
|---|---|---|
| 6,029,889 A | 2/2000 | Whalem, Jr. |
| 8,018,329 B2 | 9/2011 | Morgan |
| 8,229,473 B1 | 7/2012 | De La Rue |
| 8,995,946 B2 | 3/2015 | Miller |
| 2004/0174269 A1 | 9/2004 | Miller |
| 2005/0017070 A1* | 1/2005 | Miller .................... G06K 17/00 235/380 |
| 2007/0120671 A1* | 5/2007 | Carmichael ............ A62C 99/00 340/572.1 |
| 2007/0240198 A1* | 10/2007 | Kander .............. G07C 9/00103 726/2 |
| 2011/0227726 A1* | 9/2011 | Lee .................... G08B 21/0202 340/539.13 |
| 2012/0286933 A1* | 11/2012 | Hsiao .................. G08B 25/016 340/8.1 |
| 2016/0014819 A1* | 1/2016 | Cona ................. G01C 21/3415 455/404.1 |

* cited by examiner

SMART COMMISSIONING FOR FIRST RESPONDERS IN INCIDENT COMMAND SYSTEM

CROSS REFERENCE TO RELATED APPLICATIONS

This application is a national stage filing under 35 U.S.C. 371 of PCT/US2017/047147, filed Aug. 16, 2017, which claims the benefit of U.S. Provisional Patent Application No. 62/376,040, filed Aug. 17, 2016, the disclosures of which are incorporated by reference in their entirety herein.

TECHNICAL FIELD

The present disclosure relates to a smart commissioning system, or more particularly, to a personnel commissioning system for tracking the location and movements of emergency personnel into and out of an incident site or designated zones thereof. The system described herein is configured to create an individualized personnel profile based on certain personnel data relating to each individual first responder on site, and using said personnel profile as an identifier in tracking their locations and movement via a wireless communication network.

BACKGROUND

Disasters and emergencies, whether natural or caused by man, are an unfortunate fact of life. Advance planning and preparation are key factors in dealing with such incidents. The present disclosure focuses on preparedness relating to disasters and emergency incidents, particularly those which involve first responders such as fire personnel, police, military, emergency medical technicians (EMT)/paramedics, doctors, nurses, and the like.

Accountability for all personnel at a disaster or emergency site is a key concern for all first responders. During an incident, emergency personnel from various departments or agencies, such as fire, police, medical workers, federal agents, or even utility workers may become involved at the incident site. Some of these individuals may not possess the requisite devices or equipment to communicate with incident commanders or other supervisory personnel. Similarly, an incident commander often does not have the relevant information about personnel from other departments or agencies who are involved in the incident. Thus, accountability may not be achieved for all personnel.

An on-site commander often needs to know the number of personnel on site in order to properly staff the disaster and determine whether additional reinforcements must be called in. It is also important to know identifying factors about the personnel on site, such as their position or rank, in order to establish a proper chain of command in dealing with the incident at hand. Further, the on-site commander needs to keep a precise accounting of the personnel entering and leaving an incident site, so that no first responder is left behind.

Several different systems and methods are conventionally known for the accounting of personnel at an emergency site. For example, computerized accountability systems are disclosed in U.S. Pat. Nos. 5,596,652 and 5,793,882. According to these systems, emergency responders must report to a scene with a portable machine-readable ID that not only identifies the responder, but also includes the responder's qualification information. This information is stored in a computer by the incident command and is used to assign the responder to a task or sector based upon their qualifications. U.S. Pat. No. 6,029,889 teaches the use of bar code tags or computerized tracking devices which are issued ahead of time and correspond to each individual fire fighter. These tags are specifically used to monitor the amount of time that a personnel member is present in an emergency zone, and an alarm sounds to indicate when time expires. U.S. Pat. No. 8,995,946 teaches the use of cell phone devices which are carried with each responder, which cell phones serve as an ID artifact which contains identifying information about the responder. These units contain qualification information to determine whether a personnel member is or is not allowed within a certain area. U. S. Publ. No. 2004/0174269 discloses a system which utilizes radio frequency identification (RFID) tags and RFID readers, to be displayed on a collection board having an RFID antenna. A problem with the above known systems is that the emergency responders must remember to carry pre-issued devices or ID tags with them, and responders from other departments or volunteers may not have a device or ID or tag which corresponds to the particular on-site system in use.

A clear need exists for a user-friendly, uncomplicated system having components which are capable of uniquely and properly identifying all personnel participating in an incident, and tracking their whereabouts at the incident site. A further need exists for preventing certain biographical information entered into the inventive system from becoming viewable by all persons or agencies with access to the system.

SUMMARY

Some embodiments advantageously provide a method and system for tracking the location and movements of emergency personnel into and out of an incident site or designated zones thereof.

The present disclosure provides a personnel commissioning system which enables an incident commander to uniquely identify each emergency personnel member participating at an incident site. This furthers the goals of both optimizing staffing needs and keeping track of personnel for emergency purposes. To achieve such identification, all personnel members participating in an incident go through a process termed "commissioning". For purposes of this disclosure, the term "commissioning" means registration of personnel data relating to a specific personnel member into the presently disclosed commissioning system. As an example, a personnel member's driver's license may be scanned at an entry point of the incident site. Data from the driver's license is entered into the system via scanner, and a system computer containing specialized system software creates a unique personnel profile for that personnel member. The personnel member is thus registered, or "commissioned" into the personnel commissioning system. The personnel profile is then digitally assigned, or otherwise transferred, to a scannable personnel tag which corresponds to that particular personnel member. The personnel tag is then attached to or otherwise carried by the corresponding personnel member as they enter an incident site, and their location and/or movement into and out of the incident site or designated zones therein can be monitored remotely via a wireless communication system.

To monitor the location and/or movement of commissioned personnel into and out of an incident site, a virtual geo-fence boundary must be formed around the perimeter of the incident site. The incident site may contain a single zone or multiple designated zones, and each zone may contain a single entry and/or exit point or multiple entry and/or exit points, depending on the nature of the incident and as deemed necessary by the incident commander. A dedicated personnel member may be present at each entry and/or exit point of the incident site and/or designated zones therein, with the necessary system equipment for commissioning other personnel members and/or checking them into and/or out of the incident site and/or different zones therein. Alternatively, a commissioning station may be set up wherein personnel members are each responsible for self-commissioning, or self-entry of their personnel data into the system. The location and/or movement of each commissioned personnel member may be continuously tracked or otherwise monitored, based on their corresponding personnel tag, by an incident commander via a monitoring display such as a monitoring screen, or other remote device such as a personal computer, laptop, mobile device, or the like.

The present disclosure offers several advantages over conventionally known tracking systems. Specifically, the present disclosure provides a user-friendly system which requires minimal technological knowledge to operate. Proprietary TYCO® personnel tags may be used in accordance with the disclosed commissioning system, and such tags provide a simple and uncomplicated means for easily tracking the location and/or movement of personnel at the incident site. The present system provides an effective means of communication between first responders while on site. Further, the present disclosure allows for the ability to correspond certain personnel tags with Scott Safety® products, such as Scott Safety® SCBA apparatus (self-contained breathing apparatus) and Scott Safety® PDU (personal distress unit) for efficacy. Scott Safety, a business unit of Tyco International, is a manufacturer of protective equipment and safety devices for firefighters, police, industrial workers, militaries, homeland security forces, and emergency/rescue personnel around the world. The presently disclosed system further has the flexibility to use TWAIN® compatible scanners. TWAIN® is known in the art as an applications programming interface (API) and communications protocol which regulates communication between software and digital imaging devices, such as scanners.

The present disclosure provides a personnel commissioning system comprising:

a) a data input device capable of receiving individual personnel data;

b) a data processing device capable of wired or wireless communication with said data input device, wherein said data processing device is capable of processing said individual personnel data which is input into said data input device, and wherein said data processing device is capable of executing computer readable code, which computer readable code is capable of creating a unique personnel profile based on said individual personnel data;

c) a tag creation device capable of wired or wireless communication with said data processing device, wherein said tag creation device is capable of creating a scannable personnel tag corresponding to the unique personnel profile;

d) a tag scanner capable of wired or wireless communication with said data processing device, wherein said tag scanner is capable of scanning the personnel tag at a selected scanning location, and reporting scanning location information to the data processing device;

e) a data server capable of wireless communication with said data processing device, which data server is capable of receiving and storing data of the data processing device; and f) a monitoring display capable of wired or wireless communication with said data server, which monitoring display is capable of displaying data of the data processing device via the data server.

The present disclosure further provides a personnel commissioning system comprising:

a) a data input device capable of receiving individual personnel data;

b) a data processing device capable of wired or wireless communication with said data input device, wherein said data processing device is capable of processing said individual personnel data which is input into said data input device, and wherein said data processing device is capable of executing computer readable code, which computer readable code is capable of creating a unique personnel profile based on said individual personnel data;

c) a tag creation device capable of wired or wireless communication with said data processing device, wherein said tag creation device is capable of creating a scannable personnel tag corresponding to the unique personnel profile;

d) a tag scanner capable of wired or wireless communication with said data processing device, wherein said tag scanner is capable of scanning the personnel tag at a selected scanning location, and reporting scanning location information to the data processing device;

e) a data server capable of wireless communication with said data processing device, which data server is capable of receiving and storing data of the data processing device; and f) a monitoring display capable of wireless communication with said data server, which monitoring display is capable of displaying data of the data processing device via the data server;

wherein said data input device comprises a scanner, wherein said data processing device comprises a computer, wherein said data server comprises a cloud-based server, and wherein said data server is remotely accessible via a wireless network or system, and wherein said monitoring display is capable of displaying an alert relating to the location of said personnel tag.

The present disclosure further provides a method of tracking personnel, including the steps of:

I) providing a personnel commissioning system comprising:

a) a data input device capable of receiving individual personnel data;

b) a data processing device capable of wired or wireless communication with said data input device, wherein said data processing device is capable of processing said individual personnel data which is input into said data input device, and wherein said data processing device is capable of executing computer readable code, which computer readable code is capable of creating a unique personnel profile based on said individual personnel data;

c) a tag creation device capable of wired or wireless communication with said data processing device, wherein said tag creation device is capable of creating a scannable personnel tag corresponding to the unique personnel profile;

d) a tag scanner capable of wired or wireless communication with said data processing device, wherein said tag scanner is capable of scanning the personnel tag at a selected scanning location, and reporting scanning location information to the data processing device;

e) a data server capable of wireless communication with said data processing device, which data server is capable of receiving and storing data of the data processing device; and f) a monitoring display capable of wired or wireless communication with said data server, which monitoring display is capable of displaying data of the data processing device via the data server;

II) creating a geo-fence boundary around a designated area, which geo-fence boundary includes at least one entry point and/or exit point, and which geo-fence information is capable of being stored in the data server of said personnel commissioning system;

III) entering individual personnel data of a personnel member into said personnel commissioning system via said data input device;

IV) creating a unique personnel profile based on said individual personnel data, via the execution of computer readable code by said data processing device;

V) creating a scannable personnel tag corresponding to said unique personnel profile, via said tag creation device;

VI) scanning said personnel tag, via said tag scanner, at the at least one entry and/or exit point of the geo-fence boundary;

VII) transmitting location information relating to said personnel tag to the data server; and VIII) displaying said location information of said personnel tag via the monitoring display in wired or wireless communication with said data server.

According to one aspect of the disclosure, a system for commissioning for first responders at a site of an incident is provided. The system includes a data processing device configured to: receive personnel data; generate a unique personnel profile based on the personnel data; communicating the unique personnel profile to a tag creation device for creation of a tag corresponding to the unique personnel profile; receive scanning location information of the tag (17), and cause display, at a monitoring display, of alert data associated with the scanning location information. The alert data is a result of applying at least one user-defined rule to the scanning locating information.

According to one embodiment of this aspect, the data processing device is further configured to apply the at least one user-defined rule to the scanning location information. According to one embodiment of this aspect, the system includes a data server. The data server is configured to apply the at least one user-defined rule to the scanning location information. According to one embodiment of this aspect, the at least one user-defined rule includes a rule related to permission to enter the site of the incident.

According to one embodiment of this aspect, the rule defines a minimum personnel rank for being allowed entrance into the site of the incident. According to one embodiment of this aspect, the system includes a data server. The data server is configured to: receive the scanning location information of the tag, and apply the at least one user-defined rule to the scanning location information. According to one embodiment of this aspect, the alert data indicates a location of the tag. According to one embodiment of this aspect, the tag is one taken from a group consisting of a radio frequency identification (RFID) tag and bar code based tag. According to one embodiment of this aspect, the system includes a plurality of tag scanners. The plurality of tag scanners are configured to generate a virtual geo-fence proximate the site of the incident. Each of the plurality of tag scanners is associated with respective location data identifying a respective location of the tag scanner. The data processing device is configured to store the location data of each of the plurality of tag scanners. The scanning location information of the tag is communicated from one of the plurality of tag scanners. According to one embodiment of this aspect, the unique personnel profile includes a unique personal identifier.

According to another aspect of the disclosure, a method for commissioning for first responders at a site of an incident is provided. Personnel data is received. A unique personnel profile is generated based on the personnel data. The unique personnel profile is communicated to a tag creation device for creation of a tag corresponding to the unique personnel profile. Scanning location information of the tag is received. Display, at a monitoring display, of alert data associated with the scanning location information is caused. The alert data is a result of applying at least one user-defined rule to the scanning locating information.

According to one embodiment of this aspect, the at least one user-defined rule is applied to the scanning location information at a data processing device. According to one embodiment of this aspect, the at least one user-defined rule is applied to the scanning location information at a data server. According to one embodiment of this aspect, the at least one user-defined rule includes a rule related to permission to enter the site of the incident. According to one embodiment of this aspect, the rule defines a minimum personnel rank for being allowed entrance into the site of the incident.

According to one embodiment of this aspect, the scanning location information of the tag is received at a data server. The at least one user-defined rule is applied to the scanning location information at the data server. According to one embodiment of this aspect, the alert data indicates a location of the tag. According to one embodiment of this aspect, the tag is one taken from a group of a radio frequency identification (RFID) tag and bar code based tag. According to one embodiment of this aspect, a virtual geo-fence proximate the site of the incident is generated by a plurality of tag scanners. Each of the plurality of tag scanners is associated with respective location data identifying a respective location of the tag scanner. The location data of each of the plurality of tag scanners is stored at a data processing device. The scanning location information of the tag is communicated from one of the plurality of tag scanners. According to one embodiment of this aspect, the unique personnel profile includes a unique personal identifier.

BRIEF DESCRIPTION OF THE DRAWINGS

A more complete understanding of the present embodiments, and the attendant advantages and features thereof, will be more readily understood by reference to the following detailed description when considered in conjunction with the accompanying drawings wherein.

DETAILED DESCRIPTION

Figure 1:
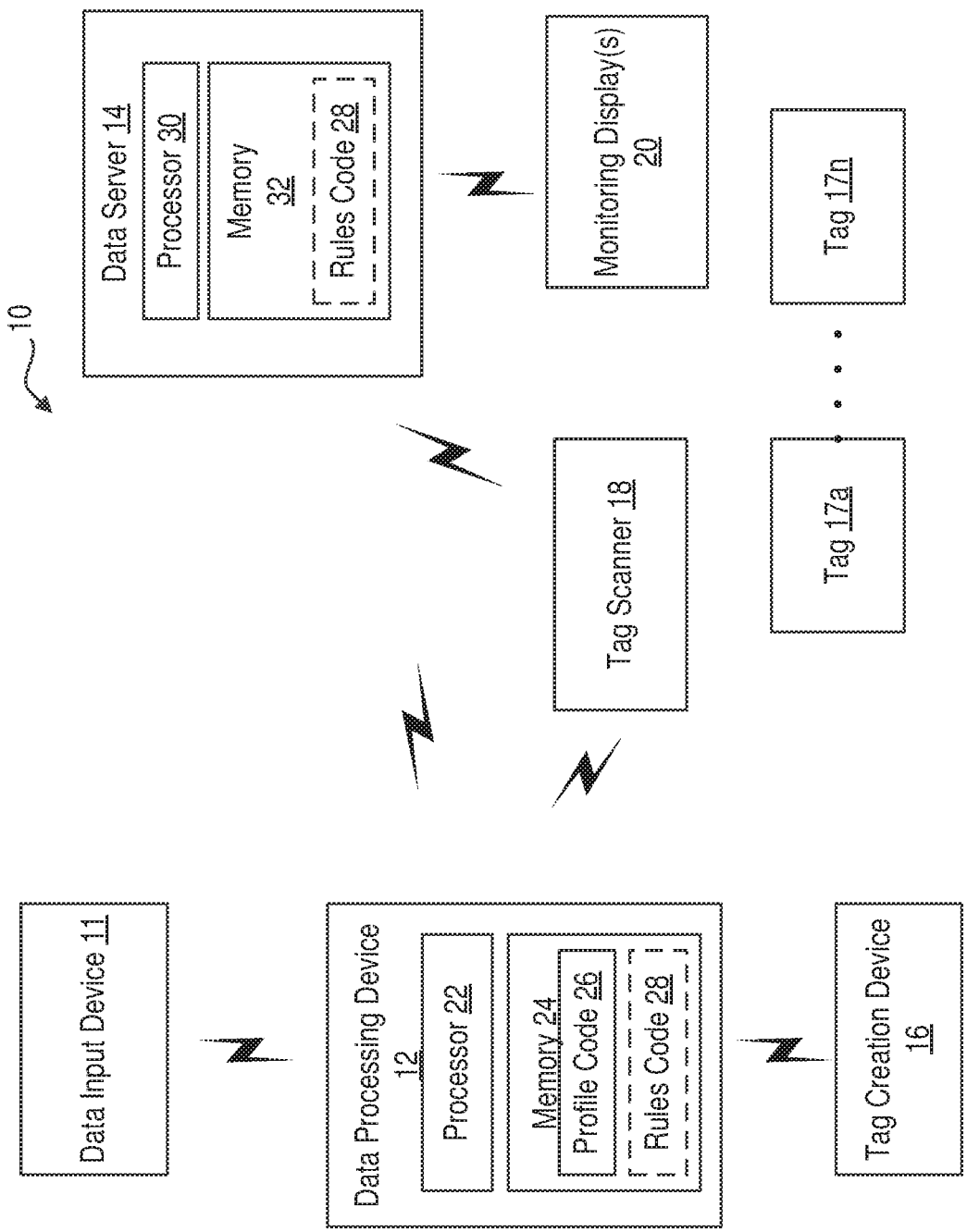
FIG. 1 is a block diagram of a system for personnel commissioning system for tracking the location and movements of emergency personnel into and out of an incident site or designated zones in accordance with the principles of the disclosure.

Before describing in detail exemplary embodiments, it is noted that the embodiments reside primarily in combinations of components and processing steps related to methods and incident command systems. Accordingly, components have been represented where appropriate by conventional symbols in the drawings, showing only those specific details that are pertinent to understanding the embodiments so as not to obscure the disclosure with details that will be readily apparent to those of ordinary skill in the art having the benefit of the description herein.

As used herein, relational terms, such as "first," "second," "top" and "bottom," and the like, may be used solely to distinguish one entity or element from another entity or element without necessarily requiring or implying any physical or logical relationship or order between such entities or elements. The terminology used herein is for the purpose of describing particular embodiments only and is not intended to be limiting of the concepts described herein. As used herein, the singular forms "a", "an" and "the" are intended to include the plural forms as well, unless the context clearly indicates otherwise. It will be further understood that the terms "comprises," "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

In embodiments described herein, the joining term, "in communication with" and the like, may be used to indicate electrical or data communication, which may be accomplished by physical contact, induction, electromagnetic radiation, radio signaling, infrared signaling or optical signaling, for example. One having ordinary skill in the art will appreciate that multiple components may interoperate and modifications and variations are possible of achieving the electrical and data communication.

Referring now to drawing figures in which like reference designators refer to like elements there is shown in FIG. 1 is a system for personnel commissioning system for tracking the location and movements of emergency personnel into and out of an incident site or designated zones in accordance with the principles of the disclosure, the system generally referred to as system "10". In one or more embodiments, the present disclosure provides a personnel commissioning system 10 comprising a plurality of components. System 10 includes one or more data input devices 11, one or more data processing devices 12, one or more data servers 14, one or more tag creation devices 16, one or more tags 17a-17n, one or more tag scanners 18, one or more monitoring displays 20. Data input device 11 is configured to receive data such as personnel data for forwarding to one or more entities in system 10, as described herein. Data input device 11 is capable of receiving individual personnel data, such as that relating to a particular personnel member, so that said personnel data can be entered into the personnel commissioning system. Examples of suitable data input devices 11 nonexclusively include scanners, card readers, bar code readers, quick response (QR) code readers, keyboards, keypads, and various other conventionally known data input devices which are suitable for entering or inputting data into a computer-based system. In certain embodiments, the data input device 11 comprises a scanner. In certain embodiments, the data input device 11 comprises a TWAIN compatible scanner, as described above. The data input device 11 is capable of wired or wireless communication with other components of the personnel commissioning system. In embodiments wherein the data input device 11 is capable of wireless communication, the data input device 11 may include a wireless transmitter and/or transceiver.

Data processing device 12 is configured to perform the functions described herein such as receiving personnel data, generating unique personnel profiles, etc. Data processing device 12 includes processor 22 and memory 24. Processor 22 corresponds to one or more processors 22 for performing data processing device 12 functions described herein. Memory 24 is configured to store data, programmatic software code and/or other information described herein. In one or more embodiments, memory 24 is configured to store profile code 26 and rules code 28. For example, profile code 26 includes instructions that, when executed by processor 22, causes processor 22 to perform the functions described herein such as the functions described with respect to FIG. 2. For example, rules code 28 includes instructions that, when executed by processor 22, causes processor 22 to perform the functions described herein such as the functions described with respect to FIG. 3. In one or more embodiments, rules code 28 is omitted from memory 24 such as if data server 14 is performing the rules process, as described herein.

In one or more embodiments, data processing device 12 is capable of wired or wireless communication with the data input device 11. Data processing device 12 is capable of processing said individual personnel data received into the system 10 via said data input device 11. Data processing device 12 further comprises and is capable of executing computer readable code, which computer readable code is capable of creating a unique personnel profile based on said individual personnel data. In one or more embodiments, the personnel data includes one or more of a first name, last name, unique identifier, driver's license number, medical information of person/responder, training information of person/responder, among other data related to one or more responders. Data processing device 12 may serve as a system computer. In certain embodiments, data processing device 12 comprises a personal computer (PC) or laptop. In certain embodiments, data processing device 12 and the data input may be present together in the form of a single component, such as a laptop computer having a keyboard. Suitable computers and computing components are well known in the art, and typically include a microprocessor and memory components such as RAM (random access memory) and ROM (read only memory).

Data processing device 12 according to the present disclosure includes system software capable of analyzing and/or processing the personnel data received from data input device 11, and creating a unique personnel profile based on said personnel data. In certain embodiments, the unique personnel profile is created such that individual personnel data relating to a particular personnel member is converted into a unique code, as described below. Once created, the unique personnel profile may be saved into memory 24, or data server 14 as described below, in the form of a data file or the like. In certain embodiments, data processing device 12 further comprises and is capable of executing computer readable code comprising a rules engine module configured to apply at least one user-defined rule to any system information relating to an emergency incident, such as personnel profiles, personnel locations and movements, and other incident-related information saved to data processing device 12 or data server 14, as described below. It is further preferred that data processing device 12 further comprises and is capable of executing computer readable code or software which allows for communication between the system components and external third party hardware, if present, such as scanners, tag readers, printers, monitors, touch-screens displays, routers, modems, keyboards, and the like. Data processing device 12 is capable of wired or wireless communication with various components of the personnel commissioning system 10. Data processing device 12 may include a wireless transmitter and/or transceiver. Data processing device 12 may be further capable of sending and/or receiving radio transmissions.

Data server 14 includes processor 30 and memory 32. Processor 30 corresponds to one or more processors 30 for performing data server 14 functions described herein. Memory is configured to store data, programmatic software code and/or other information described herein. In one or more embodiments, memory 32 is configured to store rules code 28. For example, rules code 28 includes instructions that, when executed by processor 30, causes processor 30 to perform the functions described herein such as the functions described with respect to FIG. 3. In one or more embodiments, rules code 28 is omitted from memory 32 such as if data processing device 12 is performing the rules process.

Data server 14 is capable of wired or wireless communication with certain components of the personnel commissioning system 10, including data processing device 12 and tag scanner 18, as described above. Data server 14 is capable of receiving and storing data of data processing device 12, tag scanner 18, and optionally other components of the personnel commissioning system 10. Data server 14 is preferably further configured to process data by executing system software in the form of computer readable code. Data server 14 may comprise conventional computing components such as a memory component, i.e., memory 32, a storage component, and processor 30, such that data server 14 is capable of processing data, storing data, and executing said computer readable code.

The memory component may comprise any suitable memory such as a RAM (random access memory) component, a flash memory component, or the like. The storage component may comprise any suitable conventional storage means such as a hard disk drive, flash drive, or the like. In certain embodiments, the storage component may be located on a virtual computer, wherein the actual hardware hosting the data and software may change over time. Processor 30 may comprise a microprocessor or any conventional processing component suitable for processing data received by data server 14. In certain embodiments, data server 14 and its computing components may be present within a computer such as a laptop, or within a wireless handheld mobile device such as a cell phone or tablet. In these cases, data server 14 may be built into, or unitary with, data processing device 12 or other system components such as additional PCs or mobile devices of the personnel commissioning system 10. In certain embodiments, information relating to an incident, such as personnel profiles, personnel location information, and other incident-related information is saved to data server 14.

In certain embodiments, data server 14 comprises a cloud-based data server. Various sources of cloud-based data servers are well known in the art, and may be provided by third party cloud storage partners or contractors. Data server 14 may be remotely accessed by a variety of means, such as a wireless network, cellular network, a secure web portal, a mobile device application, or the like. Data server 14 may comprise a wireless transmitter and/or transceiver. Data server 14 is configured to receive data transmitted from data processing device 12, tag scanner 18, and/or from other wireless-enabled components of personnel commissioning system 10. In certain embodiments, data server 14 is configured to wirelessly transmit data to the data processing device 12 and/or to other wireless-enabled components of the personnel commissioning system 10. Wireless transmissions between the various wireless-enabled components of the disclosed personnel commissioning system may be achieved using any suitable conventional wireless systems, networks, and/or protocol. Examples of such wireless systems may include Bluetooth® networks, cellular networks, wireless local area networks (wLAN), Zigbee® networks, TycoNet™ networks, or any other suitable means of wireless communication between devices. The Internet of Things (IoT) is known in the art as the network of physical objects or "things" embedded with electronics, software, sensors, and network connectivity, which enables these objects to collect and exchange data across existing network infrastructure. Thus, one skilled in the art would clearly and readily ascertain how the presently disclosed data server 14 would be capable of wirelessly communicating with data processing device 12 and tag scanner 18, among other wireless-enabled components of the personnel commissioning system.

Tag creation device 16 is configured to generate and/or write to one or more physical tags, as described herein. The one or more physical tags providing tag data such as scanning location information when scanned or interrogated, as described herein. Tag creation device 16, or tag writer, is capable of wired or wireless communication with data processing device 12. Tag creation device 16 is capable of creating a scannable personnel tag corresponding to the unique personnel profile. In certain embodiments, tag creation device 16 may be unitary with data processing device 12 itself. In certain embodiments, tag creation device 16 is capable of assigning, or transferring, the personnel profile created by data processing device 12 to a scannable personnel tag as described below. Tag creation device 16 may comprise any suitable conventional means for digitally assigning or transferring data, such as the unique personnel profile, to the scannable personnel tag. In certain embodiments, tag creation device 16 is capable of transferring data to a memory component of a personnel tag. In certain embodiments, tag creation device 16 comprises a digital data writing device, such as an RFID writer. In a further embodiment, tag creation device 16 comprises a data transfer port such as a USB port. In a further embodiment, tag creation device 16 comprises a data transfer connector or wire such as a USB connector or wire. In a further embodiment, tag creation device 16 comprises a Bluetooth component capable of transferring data from data processing device 12 to the scannable personnel tag via a Bluetooth connection. Tag creation device 16 is capable of wired or wireless communication with other components of the personnel commissioning system 10 as well. Tag creation device 16 may include a wireless transmitter and/or transceiver. In certain embodiments, scannable equipment tags are also created by tag creation device 16, which tags correspond to certain pieces of equipment to be monitored via the system 10.

As shown in FIG. 1, system 10 may include one or more tags 17a-17n. Tags 17a-n are referred to collectively as "tag 17". Tag 17 is configured to store or display tag data such as to provide tag to tag scanner 18, as described herein. In one or more embodiments, tag 17 is scannable personnel tag, i.e., personnel tag 17, that may include an RFID tag or other suitable device capable of containing data which is retrievable or viewable upon being scanned with the above-described tag reader 18, or tag scanner 18, as described below. In one or more embodiments, tag 17 includes a material which is suitable for resisting damage or breakage during an emergency incident, such as metal, plastic, or the like. Tag 17 preferably serves as a personal identifier for a specific individual personnel member. In one or more embodiments, each of a plurality of third party responders is associated with respective tag 17. In certain embodiments, tag 17 includes a memory component capable of receiving and storing data. In such embodiments, the memory component of tag 17 receives and is thus assigned with data, such as the unique personnel profile created for and corresponding to an individual personnel member.

In certain embodiments, tag 17 includes a global positioning satellite (GPS) transmitter and/or receiver. In such embodiments, tag 17 may be large enough to comprise a global positioning satellite (GPS) transmitter and/or receiver, yet small enough to not be cumbersome or inconvenient when attached to or otherwise carried by a disaster or emergency personnel member during an incident. Tag 17 may be physically attached to or otherwise carried by a personnel member to which it corresponds. This may be achieved using any suitable conventional attachment means such as a clip, a clip, a hook-and-loop fastener, or the like. Alternatively, tag 17 may be attached to or otherwise carried by its corresponding personnel member via a wrist band, lanyard, or the like. Tag 17 may alternatively be inserted into a pocket or other component of an article of clothing worn by a personnel member. Tag 17 is preferably capable of wireless communication with other wireless-enabled components of the personnel commissioning system. In certain embodiments of this disclosure, tag 17 may correspond to one or more Scott Safety® products or devices. Examples of Scott Safety® products useful in accordance with the present disclosure nonexclusively include Scott Safety® SCBA apparatus (self-contained breathing apparatus) and Scott Safety® PDU (personal distress unit). Tag 17 may thus be capable of communication with a centralized location, such as an incident commander PC, and vice versa. In certain embodiments, it may be necessary for an incident commander or other supervisory personnel to send an audio and/or visual signal or alert to a personnel member via their tag 17. Therefore, in certain embodiments tag 17 may preferably be capable of reverse communication, or two-way communication. Thus, tag 17 may comprise a wireless transmitter, receiver, and/or transceiver, or the like. Tag 17 may further comprise audio and/or visual components, such as a display screen or LED light or lighting array, and/or a sound component or speaker, for providing such alerts.

Tag scanner 18 is configured to scan and/or interrogate one or more physical tags for receiving tag data such as scanning location information and/or other data, as described herein. Tag scanner 18, or tag reader 18, is capable of wired or wireless communication with data processing device 12. Tag scanner 18 comprises a device capable of scanning or otherwise reading data or information from the tag 17. Tag scanner 18 is capable of scanning the tag 17 at a selected scanning location, and reporting or transmitting location information relating to said scanning location of said scanned tag 17 to data server 14. In certain embodiments, the location information is transmitted from tag scanner 18 to data processing device 12, and from data processing device 12 to data server 14. In other embodiments, the location information is transmitted from tag scanner 18 to data server 14. In certain embodiments, the scanning location information may comprise GPS coordinates of the geo-fence boundary location, GPS coordinates of the location of the tag 17, or the like. In certain embodiments, said scanning location information may comprise site-specific geo-fence boundary names or codes for said scanning locations, pursuant to the incident site setup and/or geo-fence boundaries or zones created as described below. In one or more embodiments, tag scanner 18 is present at each entry and/or exit point of the geo-fence boundary and at each entry and/or exit point of each designated zone therein, as described in detail below. Examples of suitable tag scanners 18 include but are not limited to digital data reading devices, such as barcode scanners, RFID scanners or readers, and the like. In certain embodiments, tag creation device 16 and tag scanner 18 may be present together in the form of a single component, such as an RFID reader/writer. Tag scanner 18 may be capable of wireless communication with data server 14, as described below. Tag scanner 18 may be capable of wireless communication with data processing device 12. Tag scanner 18 may be further capable of wireless communication other wireless-enabled components of the personnel commissioning system. Upon scanning a tag 17 with the tag scanner 18, a particular personnel member corresponding to said scanned tag 17 may be effectively checked into or out of the incident site at that scanning location. In certain embodiments, once the tag 17 is scanned, location information relating to the scanning location is transmitted to data server 14. In certain embodiments, this location information is cross-checked with personnel information saved to data server 14, such as the personnel member's personnel profile, in order to determine whether that personnel member is authorized to enter the incident site or a designated zone therein. A rules engine of data server 14 or data processing device 12 may determine whether the data received from tag scanner 18 meets certain user-defined rules regarding a personnel member's permission to enter the incident site or a designated zone therein.

In certain embodiments, tag scanner 18 is capable of providing an audio and/or visual signal or alert, to indicate that a personnel member is or is not authorized to enter or exit the incident site and/or designated zone therein. Such a signal or alert may originate from a rules engine of data server 14 and/or data processing device 12. As an example, if a personnel member is rightfully authorized to enter an incident site or designated zone, tag scanner 18 may provide a positive signal or alert, such as a green light or a screen display or sound which indicates that entry is authorized, according to the personnel profile stored within system 10 and accessed via data server 14 and/or data processing device 12. Alternatively, if a personnel member is not authorized to enter an incident site or designated zone, tag scanner 18 may provide a negative signal or alert, such as a red light or a screen display or sound which indicates that entry is denied, according to the personnel profile stored within system 10 and accessed via data server 14 and/or data processing device 12. In certain embodiments tag scanner 18 may be capable of reverse or two-way communication with data server 14 and/or data processing device 12. Thus, tag scanner 18 may comprise a wireless transmitter and/or transceiver. Tag scanner 18 may further comprise audio and/or visual components, such as a display screen or LED light or lighting array, and/or a sound component or speaker, suitable for providing such alerts.

Monitoring display 20 is configured to display data such as alert data and/or other data, as described herein. In one or more embodiments, monitoring display 20 provides a visual alert, as described herein. Monitoring display 20 capable of wired or wireless communication with data server 14. Monitoring display 20 is capable of displaying data of data processing device 12 via data server 14. In certain embodiments, monitoring display 20 is capable of displaying and tracking location information of the tag 17. In certain embodiments, monitoring display 20 is capable of providing a visual and/or audio alerts. Monitoring display 20 is preferably capable of displaying an alert relating to the location of tag 17. In certain embodiments, an alert is displayed via monitoring display 20 when tag 17 is scanned via tag scanner 18. Monitoring display 20 may comprise any suitable display known in the art such as a light-emitting diode (LED) light or lighting array, a screen such as a liquid crystal display (LCD) screen. Monitoring display 20 may be further capable of emitting audio sounds such as audio alerts, and may therefore comprise an audio component or speaker, suitable for providing audio alerts. Monitoring display 20 is preferably further capable of sending and receiving radio transmissions. Monitoring display 20 is preferably capable of wireless communication with other wireless-enabled components of the personnel commissioning system 10. Monitoring display 20 may comprise a wireless transmitter and/or transceiver. In certain embodiments, monitoring display 20 may comprises a personal computer (PC), laptop, cell phone, tablet, or other mobile device. Such devices may be assigned to an incident commander or other supervisory personnel. One skilled in the art will be able to readily ascertain the most appropriate and necessary type of monitoring display 20, particularly for use during a disaster or emergency environment. Information viewed on monitoring display 20 may be saved to a memory component of monitoring display 20 and/or to data server 14 or other cloud-based storage.

One or more entities in system 10 are in communication with at least one other entity using wired and/or wireless communications, as described herein. In one or more embodiments, functions of one or more entities in system 10 is provided by a one entity, as described herein. For example, in one or more embodiments, functions of data processing device 12, data input device 11 and tag creation device 16 are provided by one entity such as a modified data processing device 12.

System 10 may further comprise a wireless gateway apparatus (not shown) capable of wired or wireless communication with data processing device 12, which wireless gateway apparatus is configured to transmit wireless data transmissions between data processing device 12 and other wireless-enabled components of system 10 which are capable of wireless communication. The gateway apparatus may be attached to data processing device 12 via a port such as a USB port or the like, or the gateway apparatus may be unitary with, or a component of, data processing device itself. The gateway apparatus may be capable of communicating with wireless-enabled components of the system 10 via any suitable wireless technology such as Wi-Fi or Zigbee®, Bluetooth®, or other local networking protocol. In certain embodiments, the wireless gateway apparatus comprises a proprietary TYCO® gateway device, such as the TycoOn™ proprietary gateway.

In one or more embodiments, data input device 11, data processing device 12, tag creation device 16, tag scanner 18, data server 14, and monitoring display 20 are capable of wireless communication with each other via a wireless communication network. The wireless communication network may include satellite communication or communication via wireless internet, among other known systems of wireless communication. In certain circumstances, such as wherein the nature of the disaster or emergency is not conducive to wireless communication, a plurality of one or more of the above components may be present and in wired communication with each other.

The present disclosure further provides a method of tracking personnel, such as during the administration of an emergency or disaster incident, or at an emergency or disaster site. The presently disclosed method comprises the providing of a personnel commissioning system 10 as described above. Further, to track and monitor the location and movement of commissioned personnel into and out of an incident site using system 10, a geo-fence boundary is created around a designated area, such as around the perimeter of the incident site itself. A geo-fence boundary is a virtual boundary or perimeter which is digitally marked around a desired site. Methods of creating such geo-fence boundaries, and the equipment necessary to do so, are well known in the art. For instance, one may set boundary points having a particular latitude, longitude, and radius to define a particular area. Existing techniques for configuring and implementing geo-fences include those describe in, for example: U.S. Pat. No. 8,018,329, for "Automated geo-fence boundary configuration and activation", and U.S. Pat. No. 8,229,473 for "Geo-fence". Creating and naming of areas of the geo-fence boundaries may be done in any suitable fashion. In certain embodiments, the geo-fence boundary may be created using an NSEW (North, South, East, West) method, and may optionally include images of buildings at the incident site. In other embodiments, entry and/or exit points or designated zones may be simply created alphabetically, such as A, B, C, D, with A being the entrance, and so on. Geo-fence boundary information and other incident details are capable of being stored at data server 14 of system 10. Such information may also be stored in a memory component, i.e., memory 24, of data processing device 12. In certain embodiments, locations along the geo-fence boundary may be in wireless communication with other wireless-enabled components of system 10.

According to the present disclosure, a geo-fence boundary is formed to define a perimeter around an incident site. The geo-fence boundary comprises at least one entry and/or exit point, as deemed necessary by an incident commander or other designated personnel, based on the nature of the incident. The incident site within the geo-fence boundary may further comprise multiple zones, wherein each zone may contain at least one entry and/or exit point, depending on the nature of the incident and as deemed necessary by the incident commander. In circumstances where multiple entry and/or exit sites exist, it may be desired for the personnel commissioning system to comprise a plurality data input devices 11, data processing devices 12, tag creation devices 16, tag scanners 18, and/or monitoring displays 20, if necessary.

In furtherance of the inventive method, all personnel members participating in an incident go through a process termed "commissioning" prior to being allowed across the geo-fence boundary and into the incident site. For purposes of this disclosure, the term "commissioning" refers to the registration of a personnel member into the personnel commissioning system. This includes the step of entering individual personnel data of a personnel member seeking entry into the geo-fence boundary, into the personnel commissioning system via data input device 12 as described above.

In one embodiment of the disclosure, personnel data relating to each personnel member is collected by entering biographical personnel information from an identification card into the system via data input device 11, such as an ID scanner, at an entry point of the geo-fence boundary surrounding an incident site. In certain embodiments of the disclosure, the personnel data comprises biographical data obtained from a personnel member's driver's license.

A unique personnel profile is created based on said entered individual personnel data, via the execution of computer readable code by data processing device 12. The personnel member is thus registered, or "commissioned" into the personnel commissioning system. Data processing device 12 preferably comprises software capable of creating a unique personnel profile, which personnel profile comprises a unique personal identifier such as a unique code, said code being created based on individual personnel data which was entered into system 10 via data input device 11. The creation of a unique code corresponding to a particular personnel member serves to ensure that certain sensitive biographical data (i.e. social security number, address, and the like) may not be immediately viewable by those viewing the system, while the personnel member is still accurately identified and accounted for in system 10 via the formulated code. For instance, in one embodiment, biographical information of a personnel member is input into the personnel commissioning system by scanning of the personnel member's driver's license. This information is transmitted from data input device 11 to data processing device 12, which contains system software in the form of computer readable code capable of creating said unique personnel profile. Upon execution, the computer readable code extrapolates certain pieces of information from this license to formulate a unique personnel profile, in the form of a unique code which corresponds to that personnel member. It is preferred that the unique code is created such that, upon viewing said unique code, viewers may not be capable of immediately deciphering said code or recognizing the biographical data provided by the personnel member. In one embodiment of the disclosure, the system computer creates a personnel profile comprising a unique 8-digit code for each personnel member, based on the personnel data entered into system 10. In certain embodiments, the personnel profile may optionally comprise other identifying information in addition to this unique code, such as the personnel member's first and last name. The personnel profile may optionally be updated to include other identifying information, such as a photo or the like. However, protection of other sensitive biographical data is achieved. A further feature of system 10 is that personnel may be commissioned into system 10 without requiring that the personnel member possesses a federal identification card. This feature expands the usefulness of system 10 beyond only commissioning those carrying federal identification, so that it may be used for utility workers, emergency medical service (EMS) workers, local fire and police, and the like.

Next, tag 17, i.e., scannable personnel tag 17, is created via tag creation device 16 as described above, which personnel tag contains the unique personnel profile and thus corresponds to a single personnel member. The personnel profile is digitally assigned, or otherwise transferred, from data processing device 12 to tag 17 via tag creation device 16, as described above. Tag 17 thus corresponds to the particular personnel member associated with the personnel profile assigned to tag 17. Tag 17 is preferably attached to, or otherwise carried by, that particular personnel member. In use, tag 17 is scanned, via tag scanner 18 as described above, at least one entry and/or exit point of the geo-fence boundary surrounding the incident site and/or designated zones therein. Once scanned, the location of tag 17, and thus the personnel member corresponding thereto, may be tracked and/or monitored as described above.

As stated above, tag scanner 18 is preferably present at each entry and/or exit point of the geo-fence boundary and/or designated zones therein. Upon scanning tag 17, tag scanner 18 is capable of transmitting location information relating to tag 17 to data server 14 and/or data processing device 12.

As stated above, in certain embodiments, a dedicated personnel member may be present at each entry and/or exit point of the geo-fence boundary and/or designated zones therein, with the necessary equipment for commissioning other personnel members and/or checking them into and/or out of the incident site or designated zones therein. In certain embodiments, individual personnel members may be responsible for self-commissioning, or commissioning themselves into the system and/or checking themselves into and out of the incident site and/or designated zones therein.

The location information of tag 17 is transmitted to data server 14, and preferably saved by data server 14, as described above. This transmission of data may go directly from tag scanner 18 to data server 14, or this transmission may go from tag scanner 18 to data processing device 12, and then from data processing device 12 to data server 14. The information is saved to data server 14 and is available to be remotely accessed via at least one monitoring display 20. Monitoring display 20 may be in wired or wireless communication with data server 14, such that monitoring display 20 is capable of visually displaying information from data server 14. Remote access to data server 14 via monitoring display 20 may be achieved by any suitable means, such as via an iOS or Android or Windows device application (app), a secure web portal or dashboard, or the like.

Using system 10, the location and/or movement of each personnel member into and out of the geo-fence boundary may be visually tracked or otherwise monitored via tag 17, using monitoring display 20. A change in location information of tag 17 indicates movement across the geo-fence boundary, and thus movement of a personnel member into or out of the incident site and/or designated zones therein. System 10 thus enables an incident commander or other authorized personnel member to monitor such information via monitoring display 20, and easily keep track of which personnel members are present within an incident site at all times.

Figure 2:
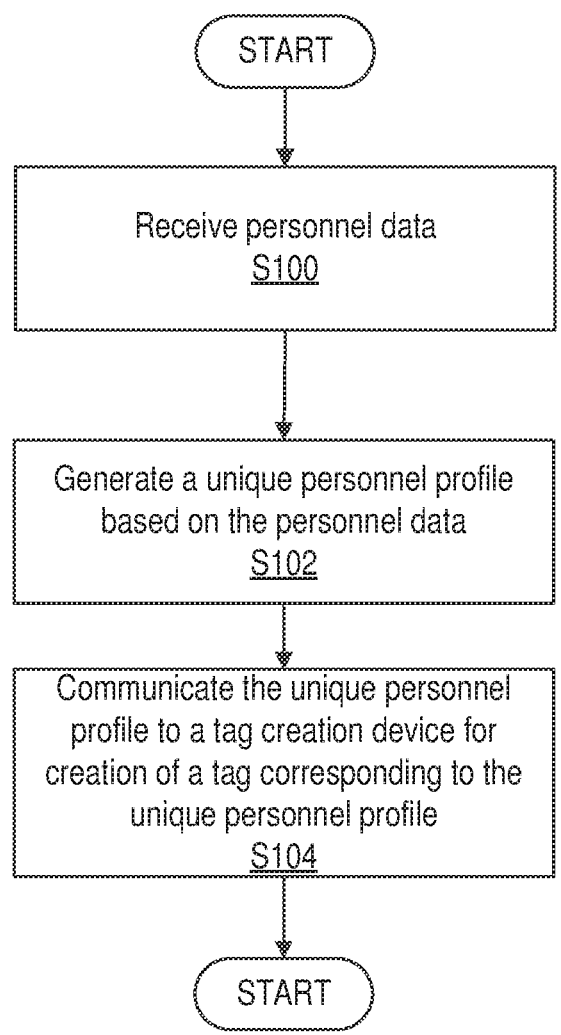
FIG. 2 is a flow diagram of an example profile creation process of profile code 26 in accordance with the principles of the disclosure.

FIG. 2 is a flow diagram of an example profile creation process of profile code 26 in accordance with the principles of the disclosure. Processor 22 is configured to receive personnel data, as described herein (Block S100). Processor 22 is configured to generate a unique personnel profile based on the personnel data, as described herein (Block S102). Processor 22 is configured to communicate the unique personnel profile to tag creation device 16 for creation of tag 17 corresponding to the unique personnel profile, as described herein (Block S104).

Figure 3:
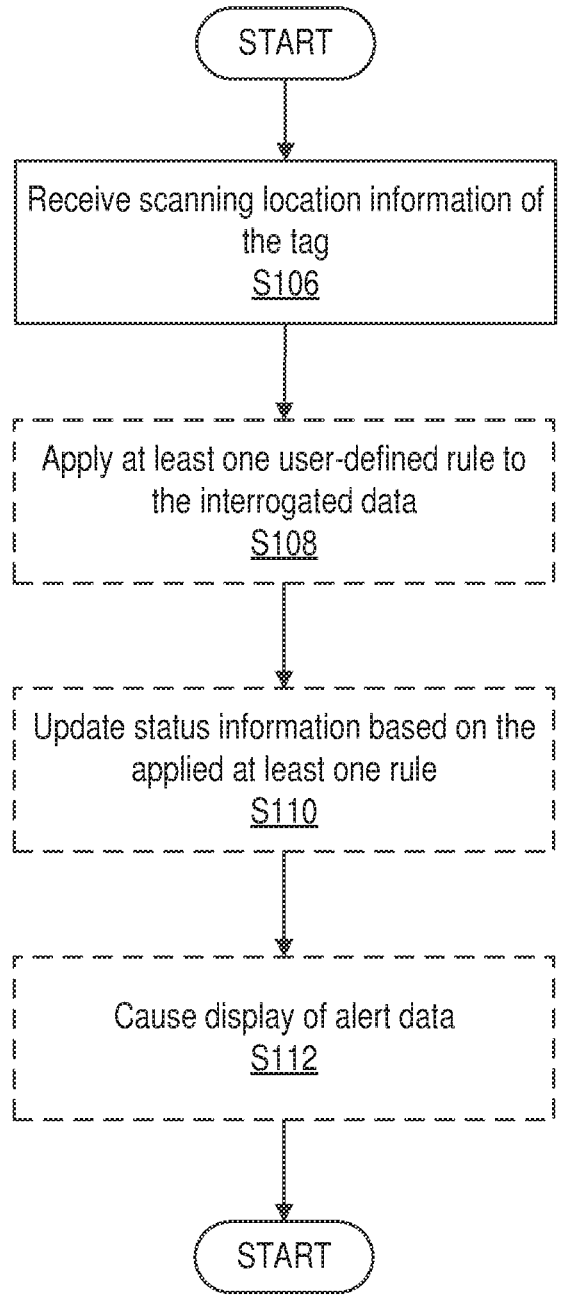
FIG. 3 is a flow diagram of an example rule engine process in accordance with the principles of the disclosure.

FIG. 3 is a flow diagram of an example rule engine process in accordance with the principles of the disclosure. Processor 30 is configured to receive scanning location information of tag 17, as described herein (Block 106). Processor 30 is configured to apply at least one user-defined rule to the interrogated data, as described herein (Block S108). Processor 30 is configured to update status information based on the applied at least one rule, as described herein (Block S110). In one or more embodiments, the at least one user-defined rule includes a rule related to permission to enter the site of the incident. In one or more embodiments, the rule defines a minimum personnel rank for being allowed entrance into the site of the incident. Processor 30 is configured to cause display of alert data, as described herein (Block S112). In one or more embodiments, the alert data is a result of applying at least one user-defined rule to the scanning locating information. In one or more embodiments, the alert data indicates a location of tag 17. In one or more embodiments, tag 17 is a radio frequency identification (RFID) tag. In one or more embodiments, system 10 includes a plurality of tag scanners 18 where the plurality of tag scanners 18 are configured to generated a virtual geo-fence proximate the site of the incident. Each of the plurality of tag scanners 18 is associated with respective location data identifying a respective location of tag scanner 18. Data processing device 12 is configured to store the location data of each of plurality of tag scanners 18. The scanning location information of tag 17 is communicated from one of the plurality of tag scanners 18. In one or more embodiments, Blocks S108 and S110 are omitted from FIG. 3, i.e., from being performed by data server 14 such as if Block S108 and S110 are performed by data processing device 12. In one or more embodiments, the rules process is performed at data processing device 12 by processor 22. In this embodiment, either or both data processing device 12 and data server 12 may perform Block S108 and S110.

Figure 4:
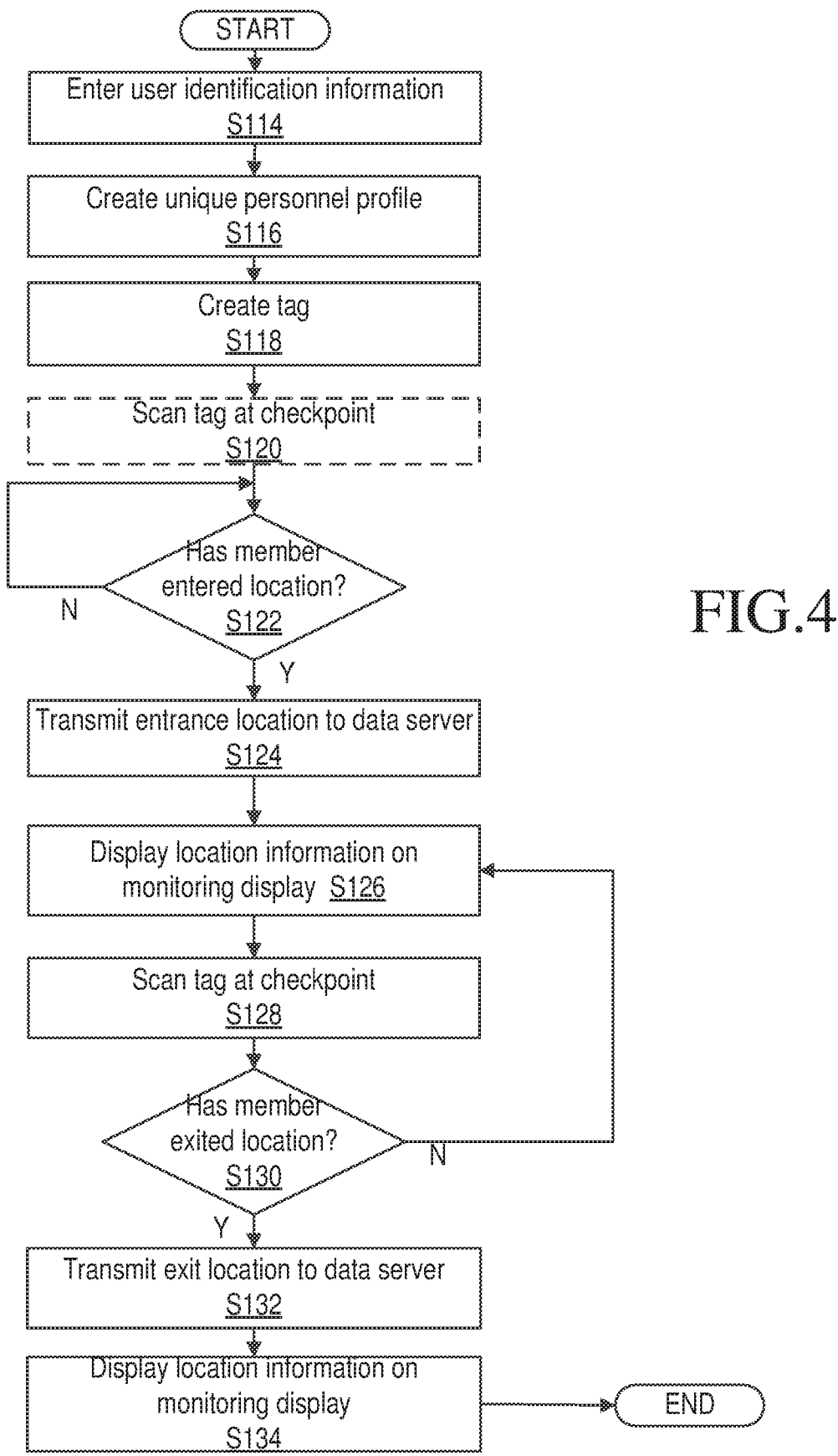
FIG. 4 is a flow diagram of an example profile creation process and rule engine process in accordance with the principles of the disclosure.

FIG. 4 is a flow diagram of an example profile creation process and rule engine process in accordance with the principles of the disclosure. Data processing device 12 is configured to receive user identification information, as described herein (Block S114). Data processing device 12 is configured to create a unique personnel profile, as described here (Block S116). Tag creation device 16 creates tag 17, as described herein (Block S118). Tag scanner 18 scans tag 17 at a checkpoint, as described herein (Block S120). Data processing device 12 is configured to determine if the member associated with the scanned tag has entered the location, as described herein (Block S122). If the member has not entered the location, the determination of Block S122 is repeated.

If the member has entered the location, data processing device 12 transmits the entrance location to data server 14, as described herein (Block S124). Monitoring display 20 is configured to display location information, as described herein (Block S126). Tag scanner 18 is configured to scan tag 17 at checkpoint, as described herein (Block S128). Data processing device 12 is configured to determine if the member associated with the scanned tag has exited the location, as described herein (Block S130). Data processing device 12 is configured to transmits exit location to data server 14, as described here (Block S132). Monitoring display 20 is configured to display location information, as described herein (Block S134). In one or more embodiments, data processing device 12 is configured to determine whether all tags that were scanned at the checkpoint (Block S120) have been scanned at the exit location (Block S130). In one or more embodiments, data processing device 12 is configured to cause monitoring display 20 to display the one or more of these tags 17 that have not been scanned at the exit location, thereby allowing an incident commander to track personnel, i.e., third party responders, that are participating in the incident response. In one or more embodiments, an alarm is triggered after a predefined time or on demand if one or more of these tags 17 have not be scanned by tag scanner 18 located at an exit location.

The following non-limiting examples serve to illustrate the present disclosure. It will be appreciated that variations in proportions and alternatives in elements of the components of the disclosure will be apparent to those skilled in the art and are within the scope of the present disclosure.

Example 1

At an emergency incident site, a designated personnel member creates a geo-fence boundary around a perimeter of the site. One entry point and one exit point are created, each having particular GPS coordinates. The geo-fence information is saved to a cloud-based data server 14. An emergency personnel member approaches the entry point, and presents his driver's license to a designated commissioning officer. The designated officer scans the personnel member's driver's license via data input device 11 in the form of a scanner. The personnel member's individual personnel data is wirelessly transmitted from the scanner to data processing device 12 in the form of a computer, which processes said data, via computer executable code, into a unique personnel profile. The unique personnel profile comprises a unique code which is saved to data server 14. The personnel member is thus registered, or "commissioned" into system 10. The personnel profile from data processing device 12 is then written to a scannable personnel tag in the form of RFID tag 17, using tag creation device 16 in the form of an RFID writer. After writing, tag 17 contains the personnel member's unique personnel profile as an identifier. Tag 17 is attached to the personnel member's uniform, and is scanned by the commissioning officer, via tag scanner 18 in the form of an RFID scanner, at the entry point of the geo-fence boundary. Location information relating to the entry point is wirelessly transmitted from tag scanner 18 to data processing device 12, and from data processing device 12 to data server 14, where said location information is saved by data server 14. Based on certain user-defined rules executed by computer readable code of data server 14, the personnel member is now designated by system software as having a status of "present" within the incident site. When the personnel member approaches the exit point of the geo-fence boundary, a designated officer scans tag 17, via tag scanner 18, as the personnel member exits the incident site. Based on certain user-defined rules executed by computer readable code of data server 14, the personnel member is now designated by system software as having a status of "not present" within the incident site. Such status information is saved by data server 14. The personnel member's statuses and entry and exit location information are viewable to an incident commander with remote access to data server 14 via a mobile phone, using a secure web portal.

Example 2

An emergency personnel member is commissioned into system 10 as described according to Example 1. The personnel profile from data processing device 12 is written to tag 17, e.g., a scannable personnel tag in the form of an RFID tag, using tag creation device 16 in the form of an RFID writer. Tag 17 now contains the personnel member's unique personnel profile as an identifier. Tag 17 is attached to the personnel member's uniform, and is scanned by the commissioning officer, via tag scanner 18 in the form of an RFID scanner, at the entry point of the geo-fence boundary. Location information relating to the entry point is wirelessly transmitted from tag scanner 18 to data processing device 12. Based on certain user-defined rules executed by computer readable code of data processing device 12, the personnel member is now designated by system 10 software as having a status of "present" within the incident site. When the personnel member approaches the exit point of the geo-fence boundary, a designated officer scans tag 17, via tag scanner 18, as the personnel member exits the incident site. Based on certain user-defined rules executed by computer readable code of data processing device 12, the personnel member is now designated by system 10 software as having a status of "not present" within the incident site. Such status information is transmitted from data processing device 12 to data server 14, and is saved by data server 14. The personnel member's statuses and entry and exit location information are viewable to an incident commander with remote access to data server 14 via a mobile phone, using a secure web portal.

Example 3

An emergency personnel member is commissioned into system 10 as described according to Example 1. The personnel profile from data processing device 12 is written to tag 17 in the form of an RFID tag, using tag creation device 16 in the form of an RFID writer. After writing, tag 17 contains the personnel member's unique personnel profile as an identifier. Tag 17 is attached to the personnel member's uniform, and is scanned by the commissioning officer, via tag scanner 18 in the form of an RFID reader, at the entry point of the geo-fence boundary. Location information relating to the entry point is wirelessly transmitted from tag scanner 18 to data processing device 12. Based on certain user-defined rules executed by computer readable code of data processing device 12, the personnel member is now designated by system software as having a status of "present" within the incident site. When the personnel member approaches the exit point of the geo-fence boundary, a designated officer scans tag 17, via tag scanner 18, as the personnel member exits the incident site. Based on certain user-defined rules executed by computer readable code of the data processing device 12, the personnel member is now designated by system 10 software as having a status of "not present" within the incident site. Such status information is transmitted from data processing device 12 to data server 14, and is saved by data server 14. The personnel member's statuses and entry and exit location information are viewable to an incident commander with remote access to data server 14 via monitoring display 20 in the form of a mobile phone, using a secure web portal. Status information is thus transmitted from data server 14 to the mobile phone, and is displayed on the mobile phone in the form of an audiovisual alert, when a personnel member's status changes from "present" to "not present", or from "not present" to "present", according to data server 14.

Example 4

An emergency personnel member is commissioned into system 10 as described according to Example 1. The personnel profile from data processing device 12 is written to tag 17 in the form of an RFID tag, using tag creation device 16 in the form of an RFID writer. Tag 17 now contains the personnel member's unique personnel profile as an identifier. Tag 17 is attached to the personnel member's uniform, and is scanned by the commissioning officer, via tag scanner 18 in the form of an RFID reader, at the entry point of a particular zone (ZONE 1) within the geo-fence boundary. Location information relating to the entry point of ZONE 1 is wirelessly transmitted from tag scanner 18 to data processing device 12, and from data processing device 12 to data server 14, where said location information is saved by data server 14. Based on certain user-defined rules executed by computer readable code of data server 14, it is determined that the personnel member does not have a desired rank, and is therefore deemed "not allowed" into ZONE 1 of the incident site. This status of "not allowed" is transmitted from data server 14 to data processing device 12, and from data processing device 12 to tag scanner 18, which tag scanner displays a visual alert in the form of a red LED light, indicating that the personnel member is not authorized to enter ZONE 1. The personnel member's status is further viewable to an incident commander with remote access to data server 14 via a monitoring display 20 in the form of a mobile phone, using a secure web portal.

Example 5

An emergency personnel member is commissioned into system 10 as described according to Example 1. The personnel profile from data processing device 12 is written to tag 17 in the form of an RFID tag, using tag creation device 16 in the form of an RFID writer. After writing, tag 17 contains the personnel member's unique personnel profile as an identifier. Tag 17 is attached to the personnel member's uniform, and is scanned by the commissioning officer, via tag scanner 18 in the form of an RFID reader, at the entry point of a particular zone (ZONE 1) within the geo-fence boundary. Location information relating to the entry point of ZONE 1 is wirelessly transmitted from tag scanner 18 to data server 14, where said location information is saved by data server 14. Based on certain user-defined rules executed by computer readable code of data server 14, it is determined that the personnel member does not have a desired rank, and is therefore deemed "not allowed" into ZONE 1 of the incident site. This status of "not allowed" is transmitted from data server 14 to tag scanner 18, which tag scanner 18 displays a visual alert in the form of a red LED light, indicating that the personnel member is not authorized to enter ZONE 1. The personnel member's status is further viewable to an incident commander with remote access to data server 14 via monitoring display 20 in the form of a mobile phone, using a secure web portal.

Example 6

An emergency personnel member is commissioned into system 10 as described according to Example 1. The personnel profile from data processing device 12 is written to tag 17, e.g., scannable personnel tag, in the form of an RFID tag, using tag creation device 16 in the form of an RFID writer. After writing, tag 17 contains the personnel member's unique personnel profile as an identifier. Tag 17 is attached to the personnel member's uniform, and is scanned by the commissioning officer, via tag scanner 18 in the form of an RFID reader, at the entry point of a particular zone (ZONE 1) within the geo-fence boundary. Location information relating to the entry point of ZONE 1 is wirelessly transmitted from tag scanner 18 to data processing device 12, and from data processing device 12 to data server 14, where said location information is saved by data server 14. Based on certain user-defined rules executed by computer readable code of data server 14, it is determined that the personnel member has achieved a desired rank, and is therefore "allowed" to enter into ZONE 1 of the incident site. This status of "allowed" is transmitted from data server 14 to data processing device 12, and from data processing device 12 to tag scanner 18, which tag scanner 18 displays a visual alert in the form of a green LED light, indicating that the personnel member is authorized to enter ZONE 1. The personnel member's status is further viewable to an incident commander with remote access to data server 14 via monitoring display 20 in the form of a mobile phone, using a secure web portal.

Example 7

An emergency personnel member is commissioned into system 10 as described according to Example 1. The personnel profile from data processing device 12 is written to tag 17, e.g., a scannable personnel tag, in the form of an RFID tag, using tag creation device 16 in the form of an RFID writer. After writing, tag 17 contains the personnel member's unique personnel profile as an identifier. Tag 17 is attached to the personnel member's uniform, and is scanned by the commissioning officer, via tag scanner 18 in the form of an RFID reader, at the entry point of a particular zone (ZONE 1) within the geo-fence boundary. Location information relating to the entry point of ZONE 1 is wirelessly transmitted from tag scanner 18 to data server 14, where said location information is saved by data server 14. Based on certain user-defined rules executed by computer readable code of the data server, it is determined that the personnel member has achieved a desired rank, and is therefore "allowed" to enter into ZONE 1 of the incident site. This status of "allowed" is transmitted from data server 14 to tag scanner 18, which tag scanner 18 displays a visual alert in the form of a green LED light, indicating that the personnel member is authorized to enter ZONE 1. The personnel member's status is further viewable to an incident commander with remote access to data server 14 via monitoring display 20 in the form of a mobile phone, using a secure web portal.

Example 8

An emergency personnel member is commissioned into system 10 as described according to Example 1. The personnel profile from data processing device 12 is written to tag 17, e.g., a scannable personnel tag, in the form of an RFID tag, using tag creation device 16 in the form of an RFID writer. Tag 17 now contains the personnel member's unique personnel profile as an identifier. Tag 17 is attached to the personnel member's uniform, and is scanned by the commissioning officer, via tag scanner 18 in the form of an RFID reader, at the entry point of a particular zone (ZONE 1) within the geo-fence boundary. Location information relating to the entry point of ZONE 1 is wirelessly transmitted from tag scanner 18 to data processing device 12, and from data processing device 12 to data server 14, where said location information is saved by data server 14. Based on certain user-defined rules executed by computer readable code of data server 14, it is determined that the personnel member has achieved a desired rank, and is therefore "allowed" to enter into ZONE 1 of the incident site. This status of "allowed" is transmitted from data server 14 to data processing device 12, and from data processing device 12 to tag scanner 18, which tag scanner 18 displays a visual alert on a display screen of tag scanner 18, indicating that the personnel member is authorized to enter ZONE 1. The personnel member's status is further viewable to an incident commander with remote access to data server 14 via monitoring display 20 in the form of a mobile phone, using a secure web portal.

In one or more embodiments, a responder or the incident commander positions the one or more tag scanners 18 at one or more locations proximate the incident such as at an entrance and/or exit, thereby allowing each tag 17 associated with a respective third party responder to be scanned. In one or more embodiments, one or more unique personnel profiles are pushed or communicated to various devices in system 10.

While the present disclosure has been particularly shown and described with reference to preferred embodiments, it will be readily appreciated by those of ordinary skill in the art that various changes and modifications may be made without departing from the spirit and scope of the disclosure. It is intended that the disclosure be interpreted to cover the disclosed embodiments, those alternatives which have been discussed above and all equivalents thereto.

In some embodiments,

Embodiment 1

A personnel commissioning system 10 comprising:

a) a data input device 11 capable of receiving individual personnel data;

b) a data processing device 12 capable of wired or wireless communication with said data input device 11, wherein said data processing device 12 is capable of processing said individual personnel data which is input into said data input device 11, and wherein said data processing device 12 is capable of executing computer readable code, which computer readable code is capable of creating a unique personnel profile based on said individual personnel data;

c) a tag creation device 16 capable of wired or wireless communication with said data processing device 12, wherein said tag creation device 16 is capable of creating a tag 17 corresponding to the unique personnel profile;

d) a tag scanner 18 capable of wired or wireless communication with said data processing device 12, wherein said tag scanner 18 is capable of scanning the tag 17 at a selected scanning location, and reporting scanning location information to the data processing device 12;

e) a data server 14 capable of wireless communication with said data processing device 12, which data server 14 is capable of receiving and storing data of the data processing device 12; and f) a monitoring display capable of wired or wireless communication with said data server 14, which monitoring display 20 is capable of displaying data of the data processing device 12 via data server 14.

Embodiment 2

The personnel commissioning system 10 of embodiment 1, wherein the data input device 11 comprises a scanner.

Embodiment 3

The personnel commissioning system 10 of embodiment 1, wherein the data processing device 12 comprises a memory component 24, a storage component 24, and a microprocessor 22.

Embodiment 4

The personnel commissioning system 10 of embodiment 3, wherein the data processing device 12 comprises a computer.

Embodiment 5

The personnel commissioning system 10 of embodiment 1, wherein the data server 14 comprises a cloud-based server.

Embodiment 6

The personnel commissioning system 10 of embodiment 1, wherein the data server 14 is remotely accessible via a wireless network or system.

Embodiment 7

The personnel commissioning system 10 of embodiment 6, wherein the data server 14 is remotely accessible via a secure web portal or mobile device application.

Embodiment 8

The personnel commissioning system 10 of embodiment 1, wherein the monitoring display 20 is capable of displaying an alert relating to the location of said tag 17.

Embodiment 9

The personnel commissioning system 10 of embodiment 1, wherein said tag 17 comprises an RFID tag.

Embodiment 10

The personnel commissioning system 10 of embodiment 1, further comprising a wireless gateway apparatus capable of wired or wireless communication with the data processing device 12, which wireless gateway apparatus is configured to transmit wireless data transmissions between the data processing device 12 and other components of the personnel commissioning system 10 which are capable of wireless communication.

Embodiment 11

A personnel commissioning system 10 comprising:
a) a data input device 11 capable of receiving individual personnel data;
b) a data processing device 12 capable of wired or wireless communication with said data input device 11, wherein said data processing device 12 is capable of processing said individual personnel data which is input into said data input device, and wherein said data processing device is capable of executing computer readable code, which computer readable code is capable of creating a unique personnel profile based on said individual personnel data;
c) a tag creation device capable of wired or wireless communication with said data processing device 12, wherein said tag creation device 16 is capable of creating a tag 17 corresponding to the unique personnel profile;
d) a tag scanner 18 capable of wired or wireless communication with said data processing device 12, wherein said tag scanner 18 is capable of scanning the tag 17 at a selected scanning location, and reporting scanning location information to the data processing device 12;
e) a data server 14 capable of wireless communication with said data processing device 12, which data server 14 is capable of receiving and storing data of the data processing device 12; and
f) a monitoring display 20 capable of wireless communication with said data server 14, which monitoring display 20 is capable of displaying data of the data processing device 12 via the data server 14;
wherein said data input device 11 comprises a scanner, wherein said data processing device 12 comprises a computer, wherein said data server 14 comprises a cloud-based server, and wherein said data server 14 is remotely accessible via a wireless network or system, and wherein said monitoring display 20 is capable of displaying an alert relating to the location of said tag 17.

Embodiment 12

The personnel commissioning system 10 of embodiment 11, further comprising a wireless gateway apparatus capable of wired or wireless communication with the data processing device 12, which wireless gateway apparatus is configured to transmit wireless data transmissions between the data processing device 12 and other components of the personnel commissioning system 10 which are capable of wireless communication.

Embodiment 13

The personnel commissioning system 10 of embodiment 11 wherein the data server 14 is remotely accessible via a secure web portal or mobile device application.

Embodiment 14

A method of tracking personnel, comprising the steps of:
I) providing a personnel commissioning system 10 comprising:
a) a data input device 11 capable of receiving individual personnel data;
b) a data processing device 12 capable of wired or wireless communication with said data input device 11, wherein said data processing device 12 is capable of processing said individual personnel data which is input into said data input device 11, and wherein said data processing device 12 is capable of executing computer readable code, which computer readable code is capable of creating a unique personnel profile based on said individual personnel data;
c) a tag creation device 16 capable of wired or wireless communication with said data processing device 12, wherein said tag creation device 16 is capable of creating a tag 17 corresponding to the unique personnel profile;
d) a tag scanner 18 capable of wired or wireless communication with said data processing device 12, wherein said tag scanner 18 is capable of scanning the tag 17 at a selected scanning location, and reporting scanning location information to the data processing device 12;
e) a data server 14 capable of wireless communication with said data processing device 12, which data server 14 is capable of receiving and storing data of the data processing device 12; and
f) a monitoring display 20 capable of wired or wireless communication with said data server 14, which monitoring display 20 is capable of displaying data of the data processing device 12 via the data server 14;

II) creating a geo-fence boundary around a designated area, which geo-fence boundary includes at least one entry point and/or exit point, and which geo-fence information is capable of being stored in the data server of said personnel commissioning system 10;

III) entering individual personnel data of a personnel member into said personnel commissioning system 10 via said data input device 11;

IV) creating a unique personnel profile based on said individual personnel data, via the execution of computer readable code by said data processing device 12;

V) creating a tag 17 corresponding to said unique personnel profile, via said tag creation device 16;

VI) scanning said tag 17, via said tag scanner 18, at the at least one entry and/or exit point of the geo-fence boundary;

VII) transmitting location information relating to said tag 17 to the data server 14; and VIII) displaying said location information of said tag 17 via the monitoring display 20 in wired or wireless communication with said data server 14.

Embodiment 15

The method of embodiment 14, wherein the data input device 11 comprises a scanner, and wherein the entering of personnel data in step (III) comprises scanning an identification card of a personnel member via said scanner.

Embodiment 16

The method of embodiment 14, wherein the data processing device 12 comprises a computer, and wherein the entering of personnel data in step (III) into said computer comprises scanning an identification card of a personnel member via a scanner in wireless communication with said computer.

Embodiment 17

The method of embodiment 14, wherein the personnel profile created according to step (IV) comprises a unique code which is based on individual personnel data entered into the data input device 12.

Embodiment 18

The method of embodiment 14, wherein the location information relating to said personnel tag comprises GPS coordinates.

Embodiment 19

The method of embodiment 14, wherein an alert is displayed via the monitoring display when the tag 17 is scanned.

Embodiment 20

The method of embodiment 14, wherein step (VIII) is conducted by remotely accessing the data server 14 via a secure web portal or mobile device application.

As will be appreciated by one of skill in the art, the concepts described herein may be embodied as a method, data processing system, and/or computer program product. Accordingly, the concepts described herein may take the form of an entirely hardware embodiment, an entirely software embodiment or an embodiment combining software and hardware aspects all generally referred to herein as a "circuit" or "module." Furthermore, the disclosure may take the form of a computer program product on a tangible computer usable storage medium having computer program code embodied in the medium that can be executed by a computer. Any suitable tangible computer readable medium may be utilized including hard disks, CD-ROMs, electronic storage devices, optical storage devices, or magnetic storage devices.

Some embodiments are described herein with reference to flowchart illustrations and/or block diagrams of methods, systems and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer (to thereby create a special purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory or storage medium that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks. It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the concepts described herein may be written in an object oriented programming language such as Java® or C++. However, the computer program code for carrying out operations of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

It will be appreciated by persons skilled in the art that the embodiments described herein are not limited to what has been particularly shown and described herein above. In addition, unless mention was made above to the contrary, it should be noted that all of the accompanying drawings are not to scale. A variety of modifications and variations are possible in light of the above teachings without departing from the scope of the following claims.

As will be appreciated by one of skill in the art, the concepts described herein may be embodied as a method, data processing system, and/or computer program product. Accordingly, the concepts described herein may take the form of an entirely hardware embodiment, an entirely software embodiment or an embodiment combining software and hardware aspects all generally referred to herein as a "circuit" or "module." Furthermore, the disclosure may take the form of a computer program product on a tangible computer usable storage medium having computer program code embodied in the medium that can be executed by a computer. Any suitable tangible computer readable medium may be utilized including hard disks, CD-ROMs, electronic storage devices, optical storage devices, or magnetic storage devices.

Some embodiments are described herein with reference to flowchart illustrations and/or block diagrams of methods, systems and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general-purpose computer (to thereby create a special purpose computer), special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory or storage medium that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the concepts described herein may be written in an object-oriented programming language such as Java® or C++. However, the computer program code for carrying out operations of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

It will be appreciated by persons skilled in the art that the embodiments described herein are not limited to what has been particularly shown and described herein above. In addition, unless mention was made above to the contrary, it should be noted that all of the accompanying drawings are not to scale. A variety of modifications and variations are possible in light of the above teachings. Accordingly, the scope should be determined not by the embodiments illustrated, but by the claims and their legal equivalents.

What is claimed is:

1. A system for commissioning for first responders at a site of an incident, the system comprising:
   a data processing device configured to:
   receive personnel data;
   generate a unique personnel profile based on the personnel data;
   communicate the unique personnel profile to a tag creation device for creation of a tag corresponding to the unique personnel profile;
   receive scanning location information of the tag, the scanning location information being provided at least by the tag; and
   cause display, at a monitoring display, of alert data associated with the scanning location information, the alert data being a result of applying at least one user-defined rule to the scanning location information, the at least one user-defined rule being based on the unique personnel profile.

2. The system of claim 1, wherein the data processing device is further configured to apply the at least one user-defined rule to the scanning location information.

3. The system of claim 1, further comprising a data server, the data server configured to apply the at least one user-defined rule to the scanning location information.

4. The system of claim 1, wherein the at least one user-defined rule includes a rule related to permission to enter the site of the incident.

5. The system of claim 4, wherein the rule defines a minimum personnel rank for being allowed entrance into the site of the incident.

6. The system of claim 1, further comprising a data server, the data server configured to:
receive the scanning location information of the tag; and
apply the at least one user-defined rule to the scanning location information.

7. The system of claim 1, wherein the alert data indicates a location of the tag.

8. The system of claim 1, wherein the tag is one taken from a group consisting of a radio frequency identification (RFID) tag and bar code based tag.

9. The system of claim 1, further comprising a plurality of tag scanners, the plurality of tag scanners configured to generate a virtual geo-fence proximate the site of the incident, each of the plurality of tag scanners being associated with respective location data identifying a respective location of the tag scanner;
the data processing device configured to store the location data of each of the plurality of tag scanners; and
the scanning location information of the tag being communicated from one of the plurality of tag scanners.

10. The system of claim 1, wherein the unique personnel profile includes a unique personal identifier.

11. A method for commissioning for first responders at a site of an incident, the method comprising:
receiving personnel data;
generating a unique personnel profile based on the personnel data;
communicating the unique personnel profile to a tag creation device for creation of a tag corresponding to the unique personnel profile;
receiving scanning location information of the tag, the scanning location information being provided at least by the tag; and
causing display, at a monitoring display, of alert data associated with the scanning location information, the alert data being a result of applying at least one user-defined rule to the scanning location information, the at least one user-defined rule being based on the unique personnel profile.

12. The method of claim 11, further comprising applying, at a data processing device, the at least one user-defined rule to the scanning location information.

13. The method of claim 11, further comprising applying, at a data server, the at least one user-defined rule to the scanning location information.

14. The method of claim 11, wherein the at least one user-defined rule includes a rule related to permission to enter the site of the incident.

15. The method of claim 14, wherein the rule defines a minimum personnel rank for being allowed entrance into the site of the incident.

16. The method of claim 11, further comprising:
receiving, at a data server, the scanning location information of the tag; and
applying, at the data server, the at least one user-defined rule to the scanning location information.

17. The method of claim 11, wherein the alert data indicates a location of the tag.

18. The method of claim 11, wherein the tag is one taken from a group of a radio frequency identification (RFID) tag and bar code based tag.

19. The method of claim 11, further comprising:
generating, by a plurality of tag scanners, a virtual geo-fence proximate the site of the incident, each of the plurality of tag scanners being associated with respective location data identifying a respective location of the tag scanner;
storing, at a data processing device, the location data of each of the plurality of tag scanners; and
the scanning location information of the tag being communicated from one of the plurality of tag scanners.

20. The method of claim 11, wherein the unique personnel profile includes a unique personal identifier.

* * * * *